United States Patent Office 3,299,103
Patented Jan. 17, 1967

---

3,299,103
1-AMINO-4-HYDROXY-2-(PHENOXY AND PHENYLTHIO) ANTHRAQUINONES
Karl Maier, Ludwigshafen (Rhine), Germany, assignor to Badische Anilin- & Soda-Fabrik Aktiengesellschaft, Ludwigshafen (Rhine), Germany
No Drawing. Filed Jan. 19, 1966, Ser. No. 521,560
Claims priority, application Germany, May 12, 1960, B 57,821
5 Claims. (Cl. 260—373)

This application is a continuation-in-part of my co-pending application Serial No. 395,594 filed September 10, 1964, and now abandoned, which again is a continuation-in-part of application Serial No. 107,016 of May 2, 1961 (abandoned).

This invention relates to dyes of the anthraquinone series containing sulfonic acid amide groups, and especially to dyes of the general formula:

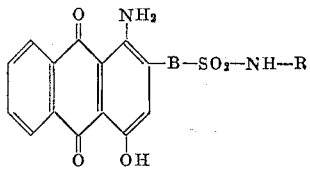

I

The invention also relates to a process for the production of dyes of the anthraquinone series containing sulfonic acid amide groups and especially to a process for the production of dyes of the general Formula I, by introducing the group —$SO_2$—NH—R in conventional manner into the phenyl radical of 1-aminoanthraquinone derivatives of the general formula:

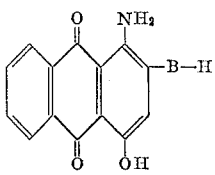

II

In the above formula, B denotes one of the bridging groups

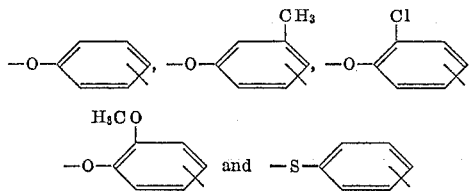

wherein the oxygen or sulfur is linked to said anthraquinone radical, and the group —R denotes alkyl or alkoxyalkyl.

The following specific groups are examples of alkyl or alkoxyalkyl: —$CH_3$, —$CH_2H_5$, —$CH_2 \cdot CH_2 \cdot CH_3$, —$(CH_2)_3 \cdot O \cdot CH_3$, —$(CH_2)_3 \cdot O \cdot C_2H_5$ and —$(CH_2)_3 \cdot O \cdot C_4H_9$ The new dyes of the general formula:

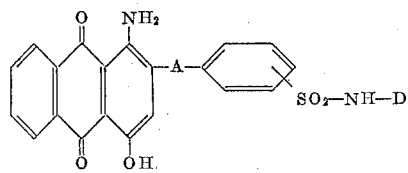

III in which A denotes an —O— or —S— bridge and D denotes the radical —$CH_2.CH_2.CH_2.O.CH_3$ or

—$CH_2.CH_2.CH_2.O.C_2H_5$ are of special industrial interest. These dyes which bear, combined by way of —$SO_2$—, the radical of a γ-hydroxypropylamine etherified at the γ-position with a low molecular weight aliphatic alcohol, are distinguished by their outstanding affinity for textile materials of polyesters and by the excellent thermal fastness properties of the dyeings.

Especially full dyeings of textile materials of polyesters are obtained with the dyes of the formulae:

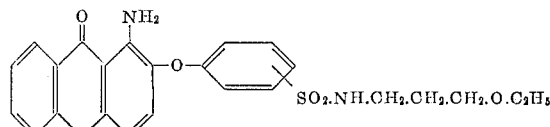

IIIa and

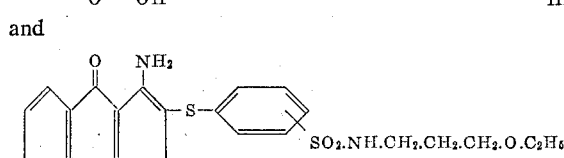

IIIb

I have found that valuable dyes of the anthraquinone series which are outstandingly suitable for dyeing products of linear polyesters are obtained by introducing a substituted or unsubstituted sulfonic acid amide group by conventional methods into the phenyl radical of a 1-amino-4-hydroxyanthraquinone derivative, which bears a substituted or unsubstituted phenyl radical attached at the 2-position by way of an atom bridge consisting of oxygen or sulfur.

The dyes according to the invention are produced in conventional manner, for example by converting 1-amino-4-hydroxyanthraquinone derivatives of the general formula:

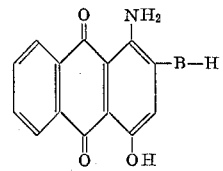

II by treatment with an excess of chlorosulfonic acid at room temperature, i.e. at about 15° to 30° C., into sulfonic acid chlorides of the general formula:

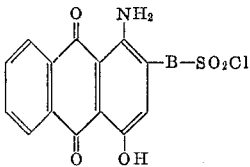

IV (B has the meaning given above) and then allowing the amines in excess to act on these compounds, if desired in the presence of solvents, such as acetone, dioxane or other usual solvents, at room to moderately elevated temperature, as a rule at about 10° to 80° C. The sulfonic acid amines formed are thus deposited from the reaction mixture. If necessary, they are separated in the usual way by acidification or dilution of the reaction solution with diluents, for example with alcohols, such as methanol or ethanol, or by steam distillation of the amines.

Since, when treating benzene derivatives with chlorosulfonic acid, sulfochlorination takes place preferentially in para-position to a substituent of the first order (see Houben-Weyl: "Methoden der organischen Chemie," 1955, vol IX, page 511), the main products obtained in the production of compounds having the general Formula III are compounds having the formula:

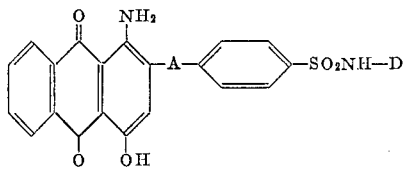

When compounds of the Formula II containing a substituted phenoxy group are used, a mixture of ortho-, meta- or para-substituted dyes is obtained as is shown by the floating bond of Formula I.

The new dyes serve above all as dispersion dyes for dyeing and/or printing hydrophobic fibrous materials, especially textile materials, such as fibers, filaments, flock, and woven and knitted fabrics of polyesters. As a rule they exhibit good affinity. Dyeings and prints obtained with these dyes on textile materials of polyesters, for example of polyethylene glycol terephthalate or on the basis of terephthalic acid and p-dimethylol-cyclohexane have excellent fastness, especially very good fastness to thermofixation, sublimation and wet treatment. They are clearly superior in their fastness properties to dyeings obtainable with similarly composed dyes, such as 1 - amino-2-phenoxy-4-hydroxyanthraquinone.

It is convenient to dye textile materials of polyesters with the new dyes in dyebaths which contain the dyes in finely dispersed form, such as is obtained for example by dissolving them in and reprecipitating them from sulfuric acid or by milling or kneading with dispersing agents, either at temperatures between 95° and 100° C., preferably at about 100° C., at atmospheric pressure, or at temperatures above 100° C., as a rule at 105° to 140° C. at increased pressure. If full dyeings are to be obtained, especially at temperatures of about 100° C., it is advantageous to add to the dyebaths swelling agents (so-called "carriers"), for example aromatic carboxylic acids or their esters, such as benzoic acid or o-hydroxy-benzoic acid or their methyl esters, or phenols, such as o- or p-hydroxydiphenyl, or aromatic halogen compounds, such as chlorbenzenes, or aromatic hydrocarbons, such as diphenyl, or carbinols, such as phenyl methyl carbinol, or halogenphenols, such as 3- or 4-chlorophenol.

For printing with the new dyes, printing pastes are used which contain the dyes in finely divided form in addition to the usual thickeners and printing auxiliaries. It is advantageous to add swelling agents to the printing pastes. After printing, the material is dried and steamed as usual or treated with hot air and then finished. Conventional thickeners are for example crystal gum, alginates, carob bean flour, starch ethers or starch. Resorcinol, p-hydroxydiphenyl, o-hydroxydiphenyl and β-naphthol are examples of printing auxiliaries.

The dyes obtainable according to the invention may advantageously be used in admixture with each other or with other dyes. They may be used not only for dyeing and/or printing textile materials, but also for spun-dyeing. The new dyes may also be used for dyeing products, such as sheets or films, of linear polyesters.

The invention is illustrated by, but not limited to, the following examples. The parts specified in the examples are parts by weight and the melting points are uncorrected.

*Example 1*

20 parts of 1-amino-2-phenoxy-4-hydroxyanthraquinone are introduced in finely divided form into 80 parts of chlorsulfonic acid within 30 minutes at 20° to 25° C. After stirring for two hours at this temperature, the mixture is poured onto ice, the reaction material sharply filtered off by suction and washed with ice-water until it has a slightly acid reaction. The moist filtered material is then introduced into 80 parts of γ-methoxypropylamine while cooling and then stirred for about two to four hours at room temperature. After standing for 12 to 15 hours, the reaction product is filtered off by suction, washed with methanol and water and dried. 20 parts of dye are thus obtained which gives full pink dyeings with good fastness properties on polyester fabric on the basis of terephthalic acid and ethylene glycol. The new dye having the formula:

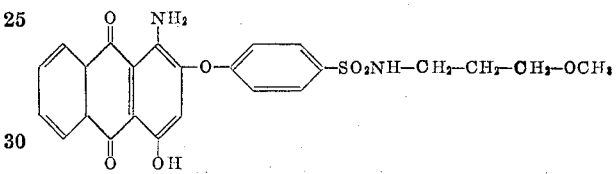

has a melting point of 157° to 158° C. after recrystallization from chlorbenzene.

By starting from the sulfonic acid chlorides and amino compounds specified in the following table and following an analogous procedure, the dyes listed are obtained in the yields and with the properties specified. These dyes dye textile materials of polyethylene glycol terephthalate pink shades of good fastness properties.

| Sulfonic acid chloride from: | Amino compound | Properties (melting point after recrystallization from): | Yield in parts |
|---|---|---|---|
| 80 parts of 1-amino-2-phenoxy-4-hydroxyanthraquinone. | 160 parts of γ-ethoxypropylamine (dissolved in 100 parts of dioxane). | 145°–146.5° C. from methanol | 93 |
| 25 parts of 1-amino-2-phenoxy-4-hydroxyanthraquinone. | 70 parts of γ-butoxypropylamine | 120°–121° C. from methanol | 17.5 |
| 20 parts of 1-amino-2-(3-methyl-phenoxy)-4-hydroxyanthraquinone. | 90 parts of γ-methoxypropylamine | 150°–150.5° C. from chlorbenzene | 26 |
| 20 parts of 1-amino-2-(2-chlorphenoxy)-4-hydroxyanthraquinone. | 40 parts of γ-methoxypropylamine (dissolved in 80 parts of dioxane). | 150°–151.5° C. from a mixture of ethyl acetate and ethanol. | 17 |
| 20 parts of 1-amino-2-(2-methoxy-phenoxy)-4-hydroxyanthraquinone. | 80 parts of γ-methoxypropylamine | 151°–151.5° C. from chlorbenzene | 18 |

The following procedure may be adopted when dyeing with the said dyes:

100 parts of fabric of polyethylene glycol terephthalate are dyed for 90 minutes at boiling temperature in a bath which contains, in 3000 parts of water, 0.5 part of the finely divided dye described in paragraph 1 of this example and 4 parts of finely divided o-hydroxydiphenyl. The dyed fabric is then aftertreated for 15 minutes at 75° C. in another bath which contains 4 parts of sodium dithionite and 4 parts of 30% aqueous sodium hydroxide solution in 4000 parts of water. Very pure dyeings are obtained in pink shades of excellent light fastness and very good fastness to laundering, sublimation and thermofixation.

*Example 2*

15 parts of 1-amino-2-phenylthio-4-hydroxyanthraquinone are converted into the sulfonic acid chloride as described in Example 1. The moist sulfonic acid chloride is introduced while cooling into 60 parts of γ-methoxypropylamine and the mixture stirred for about 3 to 4 hours at room temperature. The reaction product is worked up in the way described in Example 1, 18 parts of dye being obtained which after recrystallization from butanol has a melting point of 131° to 133° C. and dyes textile material of polyethylene glycol terephthalate full violet shades of good fastness properties.

By starting from 25 parts of 1-amino-2-phenylthio-4-hydroxyanthraquinone and using 20 parts of γ-ethoxy-propylamine, dissolved in 200 parts of dioxane, and proceeding in an analogous way, 18 parts of dye are obtained which after recrystallization from propanol has a melting point of 167° to 168° C. and dyes textile material of polyethylene glycol terephthalate full violet shades of good fastness properties.

The following paragraph explains the printing of textile materials with the said dyes.

Polyester fabric on the basis of ethylene glycol and terephthalic acid is printed with a printing paste which contains, in 1,000 parts:

30 parts of the finely divided dye described in the first paragraph of this example;
20 parts of tri-isobutyl phosphate;
10 parts of the sodium salt of the disulfimide of a mixture of hydrocarbons having on the average about 10 atoms;
650 parts of crystal gum; and
290 parts of water, dried and steamed for 30 minutes at a pressure of 0.5 atmosphere gauge. Full violet prints are obtained which exhibit very good fastness properties.

I claim:

1. Dyes of the formula:

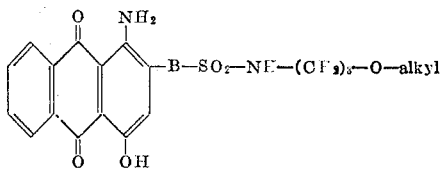

wherein B is selected from the groups consisting of

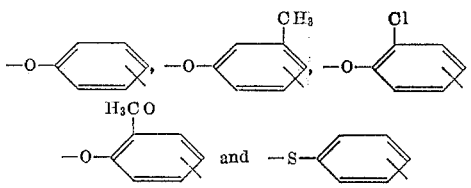

in which groups the oxygen and the sulfur are attached to the anthraquinone nucleus and wherein alkyl represents an alkyl group with 1 to 4 carbon atoms.

2. The dye of the formula:

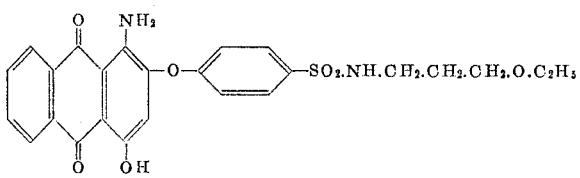

3. The dye of the formula:

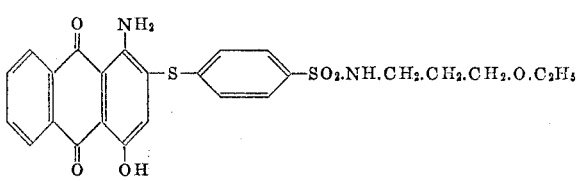

4. The dye of the formula:

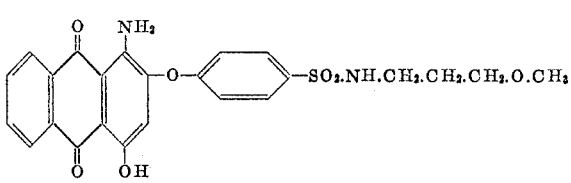

5. The dye of the formula:

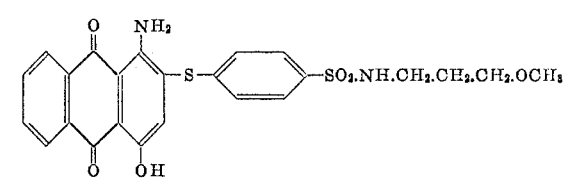

References Cited by the Examiner
UNITED STATES PATENTS 2,992,240  7/1961  Lodge _____ 260—371 X
3,147,287  9/1964  Boyd et al. _____ 260—373

LORRAINE A. WEINBERGER, *Primary Examiner.*

H. C. WEGNER, *Assistant Examiner.*